UNITED STATES PATENT OFFICE.

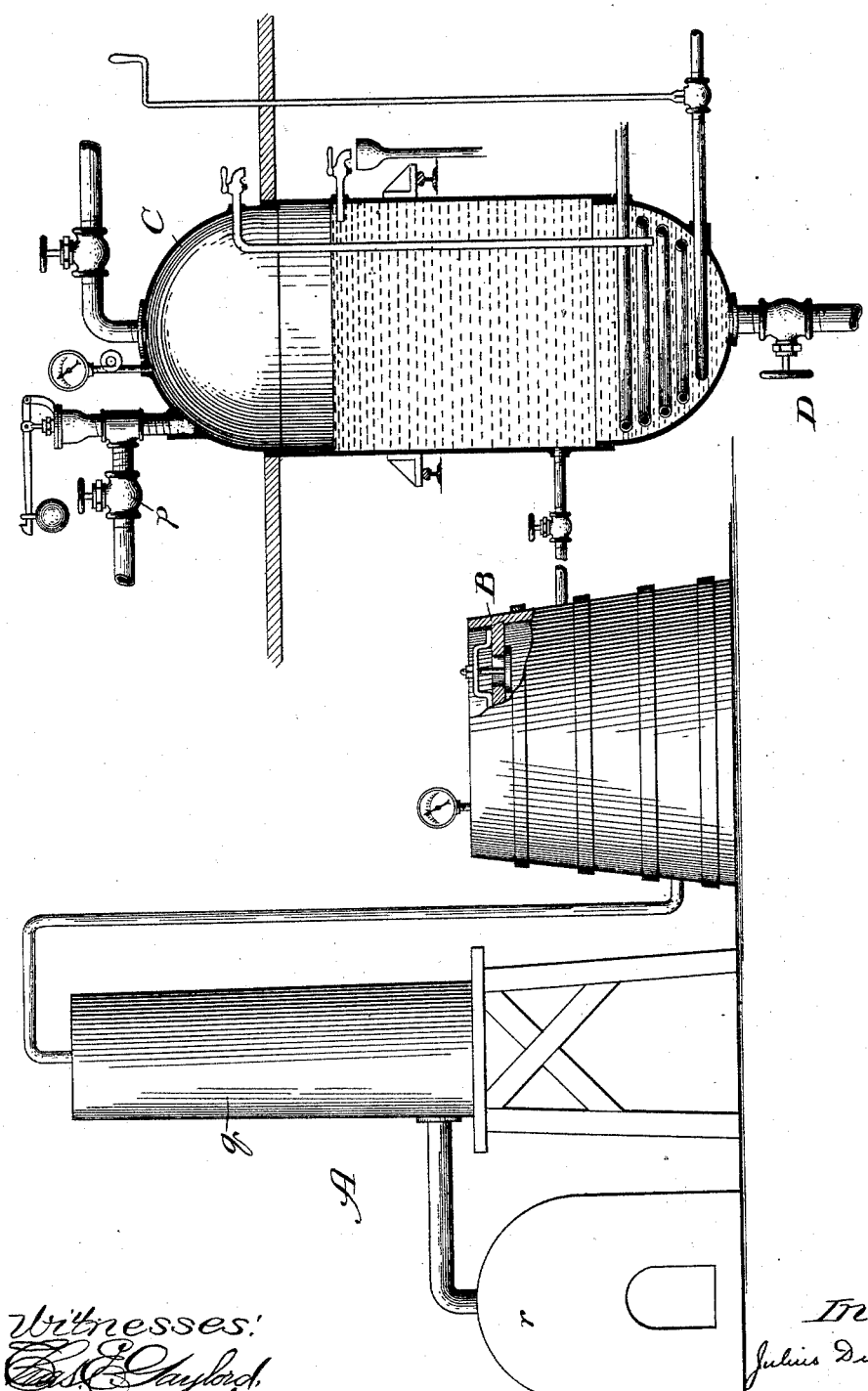

JULIUS DUBIEL, OF WAUKEGAN, ILLINOIS, ASSIGNOR OF ONE-THIRD TO EMANUEL STEIN, OF SAME PLACE.

MANUFACTURE OF GLUCOSE OR SUGAR.

SPECIFICATION forming part of Letters Patent No. 456,481, dated July 21, 1891.

Application filed March 10, 1891. Serial No. 384,482. (No model.)

*To all whom it may concern:*

Be it known that I, JULIUS DUBIEL, a citizen of the United States, residing at Waukegan, in the county of Lake and State of Illinois, have invented a new and useful Improvement in Manufacture of Glucose and Sugar, of which the following is a specification.

According to the process hitherto commonly practiced of converting starch into glucose and sugar, sulphuric acid, nitric acid, muriatic acid, oxalic acid, or some analogous acid in solution has been employed, which, after its transforming action upon the starch has been obtained, requires to be neutralized and removed as completely as possible from the saccharine liquid. To accomplish these ends it is necessary to use a suitable alkali—such as the carbonate of lime or of soda—which, however, leaves a salt that contaminates the glucose with a salty by-taste; and to free the saccharine liquid from the precipitate of neutralized matter it is common to filter the liquid through bags, filter-presses, and the like, which is not only troublesome, but entails material loss of the saccharine matter.

The object of my improvement is materially to simplify and reduce the cost of the conversion of the starch and at the same time to produce a superior article of glucose or sugar.

To accomplish my aforesaid object I employ as the converting medium sulphurous acid, ($SO_2$.)

In the accompanying drawing is shown by way of a diagram apparatus for generating and storing under pressure the sulphurous acid to be used for practicing my improved process, the reservoir controllably communicating, to that end, with a closed converter.

A denotes a sulphurous-acid generator, comprising a kiln $r$ and a collector $q$, the latter communicating with a suitable reservoir B for receiving and holding under pressure the gas which enters it from the generator; and C is a well-known or any suitable form of closed converter controllably communicating with the reservoir.

A pump (not shown) is provided for forcing the gas from the generator into the reservoir B.

To practice my improvement, I proceed as follows: Into the closed converter C containing the supply of the starch solution, and in which it is boiled, I force (after the liquid has been raised to the boiling-point and a valve $p$ has been closed to seal the converter) from the reservoir B sulphurous acid by the excess of pressure maintained in the reservoir over that generated by the boiling in the converter. The supply of acid is cut off upon ascertaining by test that the desired degree of acidulation has been reached. When, by continuing the boiling under pressure in the converter, the point of conversion is reached, (requiring a longer time for sugar than for glucose, the production of either of which depends, of course, on the relatively different quantity of starch in the solution,) the saccharine liquid contents of the converter are discharged into an open tank, (not shown,) whence there is a free escape of the steam and sulphurous acid while the liquid is cooling, the heat of the liquid rendering the acid highly volatile, thereby enabling it to pass off readily, and thus obviating the necessity of neutralizing the acid to get rid of it.

As will thus be seen, my improvement affords the advantages of reducing the cost of manufacture, since it obviates the use of any neutralizing agent and the work of and loss in getting rid of the same and enables the use of a comparatively cheap converting agent; besides, it avoids any necessity for the common practice of evaporating water used to wash the precipitate separated by the filtering operation, and which contains considerable saccharine matter, because by my improvement there is no precipitate.

My improvement also reduces the work of the bone-black in the filters through which the liquid is finally passed, since the liquid has fewer salts, free acids, and the like, to act on, and is not, therefore, so hard on the bone-black—or, in other words, it does not so rapidly reduce the absorption power thereof—and it therefore also accelerates the action of the bone-black. Furthermore, the product is superior for every use, and it has a neutral flavor—that is to say, a flavor uncontaminated by acids and salts.

What I claim as new, and desire to secure by Letters Patent, is—

The process of manufacturing glucose and sugar, which consists in boiling the starch solution in a converter and driving out the air from the converter by the steam generated by the boiling, then sealing the converter and introducing therein sulphurous acid under pressure, continuing the boiling under pressure till the desired degree of conversion is attained, then relieving the pressure, and finally removing the converting agent from the product by evaporation, substantially as described.

JULIUS DUBIEL.

In presence of—
J. W. DYRENFORTH,
M. J. FROST.